No. 708,117. Patented Sept. 2, 1902.
W. F. BOWERS.
RETAINER FOR HOSE COUPLINGS.
(Application filed Apr. 3, 1902.)
(No Model.)
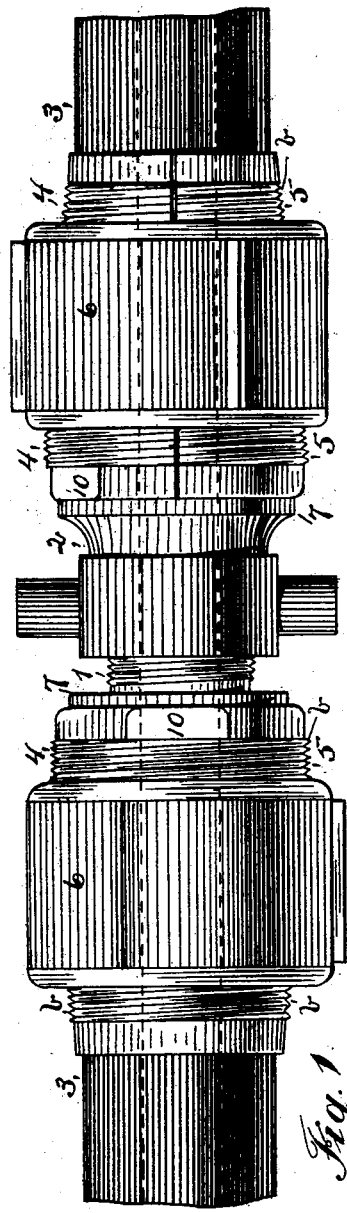
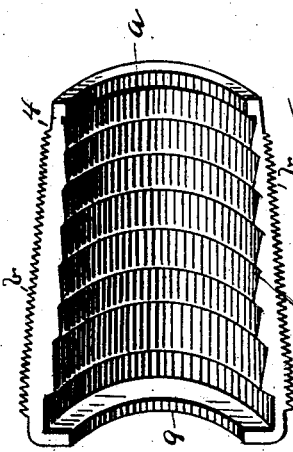
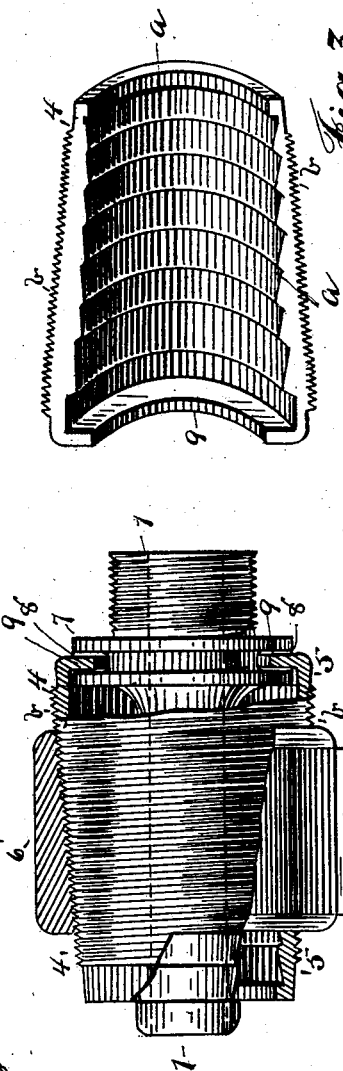
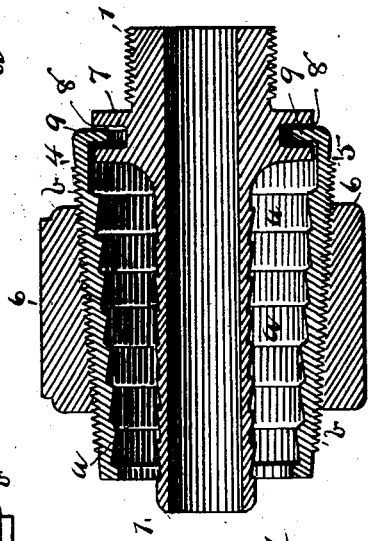
WITNESSES:
INVENTOR:

UNITED STATES PATENT OFFICE.

WILLIAM F. BOWERS, OF SAN FRANCISCO, CALIFORNIA.

RETAINER FOR HOSE-COUPLINGS.

SPECIFICATION forming part of Letters Patent No. 708,117, dated September 2, 1902.

Application filed April 3, 1902. Serial No. 101,230. (No model.)

*To all whom it may concern:*

Be it known that I, WILLIAM F. BOWERS, a citizen of the United States, residing in the city and county of San Francisco, State of California, have invented certain new and useful Improvements in Retainers for Hose-Couplings; and I do hereby declare the following to be a full, clear, and exact description of the same.

The present invention is designed more especially for use in connection with hose utilized under heavy pressure or those through which steam is conveyed. As at present constructed or connected to the hose the coupling ofttimes blows out, either due to the high pressure of the water forced therethrough or to the steam or hot air softening the inner surface or the hose adjacent the coupling and weakening the same to such an extent that the coupling hold is destroyed and the same slips therefrom.

The object of the present invention is to so arrange the retaining means as to render it impossible to remove the locked coupling without tearing the holding-thimble and its tightening nut or collar from off the hose end.

To comprehend the invention, reference should be had to the accompanying sheet of drawings, wherein—

Figure 1 is a broken detail view of the hose-coupling uniting the ends of a hose; Fig. 2, a detail view of one section of the coupling; Fig. 3, a perspective view of the retaining-thimble, partly broken away; and Fig. 4 is a longitudinal sectional view of the coupling, thimble, and tightening-nut.

The coupling ordinarily is composed of the male section 1 and the female section 2; but for the purpose of the present invention either section may be treated as a coupling. These couplings are of the usual construction and are fitted within the ends of the hose 3. To secure the coupling within the hose and hold the hose firmly thereto, a thimble is employed. This thimble consists of the cylindrical sections 4 5, which when brought together approximately embrace the entire circumference of the hose. The inner face of each thimble-section is formed with a series of ribs $a$, which when the sections are brought together bite into the outer surface of the hose in order to prevent slipping thereof. It will be understood that roughening the inner face of the thimble-sections will answer for the ribs formed thereon.

The thimble or holding-shell is made tapering toward its inner end, and screw-threads $b$ are cut on its outer face, so as to receive the tightening-nut 6, which screws thereon. As this nut is screwed upon the retaining-thimble or shell it gradually forces the sections thereof together. The tightening of the thimble or shell causes the same to bear firmly upon the surface of the hose at all points and to force the same against the roughened face of the hose-coupling.

To provide against withdrawal of the coupling from the hose, each coupling is formed with a circular collar 7, against the wall of which the end of the hose abuts. In this collar is cut a groove 8, into which the inwardly turned or flanged ends 9 of the thimble-sections fits. The thimble or retaining-shell is thus locked directly to its coupling. Hence without releasing the tightening-nut the coupling cannot be removed from the hose without drawing the thimble therewith. Should the coupling become loose, it is only required to screw up the adjusting-nut in order to wedge the hose between the said coupling and the retaining thimble or shell.

The end of the retaining thimble or shell is flattened at points 10, so as to permit of a spanner being used or the thimble-sections otherwise held from slipping while the tightening-nut 6 is screwed thereon.

By the described invention an even pressure is brought to bear upon the retained end of the hose throughout its circumference. Again, there are no hinged joints employed and no projecting parts to be damaged by handling.

Having thus described the invention, what is claimed as new, and desired to be protected by Letters Patent, is—

In a device of the character described, the combination with a coupling provided with a peripherally-grooved collar and a tubular extension adapted to fit into the end of a hose, of a tapering externally-screw-threaded sectional thimble which surrounds the end of the hose fitted over the tubular extension of the coupling, the outer end of the thimble-sections being inwardly flanged to engage with the peripheral groove of the coupling-collar, and a tightening-nut which screws onto the tapering screw-threaded thimble.

In witness whereof I have hereunto set my hand.

WILLIAM F. BOWERS.

Witnesses:
N. A. ACKER,
D. B. RICHARDS.